Jan. 30, 1968   W. E. BUCK ET AL   3,366,439
ILLUMINATION AND SHUTTERING IN HIGH SPEED PHOTOGRAPHY
Filed May 10, 1965   3 Sheets-Sheet 1

INVENTOR
WILLARD E. BUCK
THOMAS E. HOLLAND
BY
ATTORNEYS

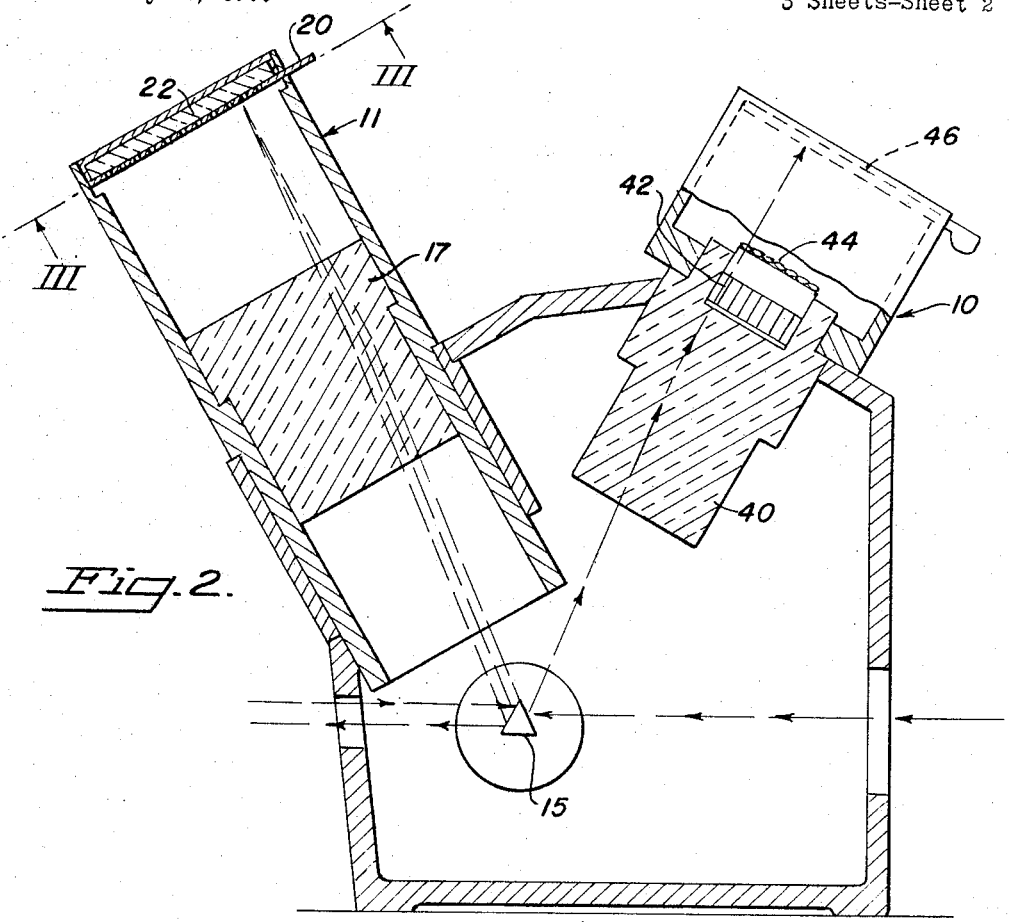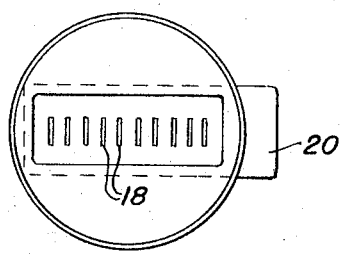

United States Patent Office  3,366,439
Patented Jan. 30, 1968

3,366,439
ILLUMINATION AND SHUTTERING IN HIGH SPEED PHOTOGRAPHY
Willard E. Buck, Santa Clara, and Thomas E. Holland, Sunnyvale, Calif., assignors to Beckman & Whitley, Inc., San Carlos, Calif., a corporation of Delaware
Filed May 10, 1965, Ser. No. 454,611
14 Claims. (Cl. 352—84)

ABSTRACT OF THE DISCLOSURE

A high speed photographic system utilizing a laser beam for illumination in cases where light from a self-luminous object or event to be recorded is too intense to permit making a satisfactory photographic record including means for chopping the beam into spaced pulses which have excellent characteristics for use in place of conventional shuttering means.

---

The study of certain phenomena by high speed photography is limited by the excessive brilliance caused by the phenomena. Rocket exhausts, plasma jets and high speed particles where motion in air gives rise to illumination often cannot satisfactorily be recorded photographically. For example a burning bridge wire which is a device commonly used to provide illumination for photographing non-luminous objects produces a light in the order of 100 times that of the sun and therefore, prior to the present invention, a burning bridge wire has not been satisfactorily photographed.

It is the object of the present invention to provide means for making a photographic record of an object or event illuminated by a laser beam while eliminating most of the light created by the event itself.

A further object is to produce a high speed framed record with light from a laser or other beam of light in which shuttering is accomplished entirely by a unique system of masking the beam before it enters the objective system of a camera.

Further and more specific objects and advantages of the invention are made apparent in the following specification wherein it is described in further detail by reference to the accompanying drawings.

In the drawings:

FIG. 2 is an enlarged sectional view showing details of some mechanism illustrated in FIG. 1;

FIG. 3 is a sectional view taken on the line III—III of FIG. 2; and

While the invention is shown and described herein as used for producing a framed record in a framing camera of a known kind, it will become apparent as the description proceeds that it is not limited to use with the type of camera disclosed, nor in fact to framing cameras, but can as well be used with only obvious modifications with a streak camera for producing a streak record. Furthermore a laser is disclosed herein as a source of coherent monochromatic light though for some purposes other light sources might be used which do not provide monochromatic light, it being understood that the camera to be described has many possible uses.

Figure 1:
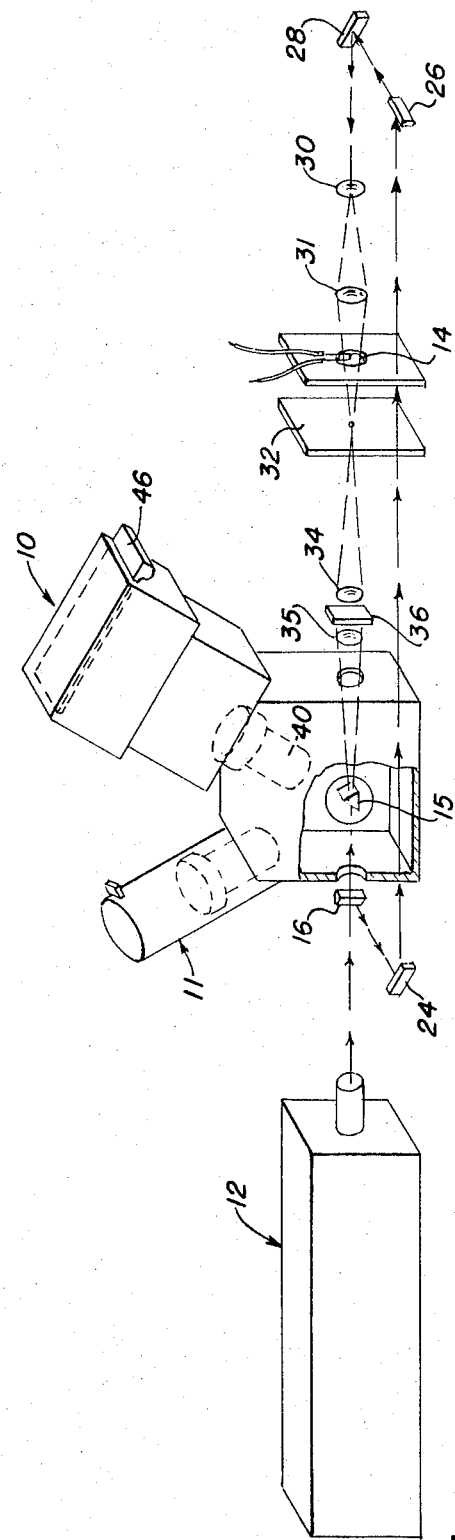
FIG. 1 is a perspective schematic view of a system including a camera of the high speed framing type shown with mechanism for utilizing light from a laser for illuminating an event to be recorded by the camera and including means to prevent recording of the light from the event.

In FIG. 1, most of the optical components of the present invention are shown without a housing or support means for the purpose of simplification. A high speed framing camera is generally indicated at 10 and has a shuttering mechanism generally indicated at 11 for shuttering light from a laser 12 for the purpose of taking framed exposures of an object here shown as a bridge wire 14. The bridge wire is fired and timed by a known electrical circuit (not shown) designed for that purpose. The laser 12 may be any one of several types of lasers though in the present case an argon gas pulse laser is employed and this laser produces a blue laser beam.

The course of a beam emitted from the laser may be followed by arrows and is seen first to impinge a rotating mirror 15 of the camera 10 having passed directly behind a mirror shown as a triangular prism 16. The rotating mirror 15 reflects the beam upwardly through a collimating lens 17 in the shuttering mechanism (see also FIG. 2) and thence through spaced slits 18 (best shown in FIG. 3) which form stops in a stop plate 20 arranged to slide into place over the surface of a flat mirror 22. This chops or separates the beam into intermittent pulses of light which are reflected back through the collimating lens 17 again to impinge the rotating mirror 15 and to be reflected thereby to the stationary mirror 16. This light follows closely the path of the beam between the laser and the rotating mirror. The stationary mirror 16 has been made in the form of a prism so that the thickness of the mirrored portion thereof is not great and permits the beams passing in opposite directions to be very close to each other. The intermittent beam from the mirror 16 is then reflected as by mirrors 24, 26 and 28 to a point where it follows a path which is coaxial with the objective system of the camera 10 and the object 14 to be recorded.

A pair of lenses 30 and 31 arranged to act in a manner of an inverted telescope are disposed in the path of the beam to cause it to diverge to a dimension satisfactory for illuminating the object, or in the present case the event to be recorded, because it is the burning and phenomena incident thereto of which a record is to be made. The beam, converging after leaving the lenses 30 and 31, passes an aperture stop 32, the aperture of which is just sufficiently large to pass the laser beam in its small dimension while the stop eliminates a great portion of the light created by the burning bridge wire. The objective system of the camera, shown as a pair of lenses 34 and 35, serves to focus the beam containing the image of the event back again to the rotating mirror 15. A filter 36, which in this case is blue, between the objective lenses serves to filter most of the light from the burning bridge wire which has passed through the aperture stop and permits only the monochromatic light of the laser beam to enter the camera.

One of the advantages of the present invention resides in the use of the same rotating mirror for shuttering and for directing the intermittent light into the camera. Where the event to be recorded is illuminated intermittently it is obvious that exposure of the film in the camera must coincide with the period of illumination and by using the same mirror for two purposes, the necessity of costly means for synchronizing separate mirrors is eliminated.

The mirror 15 sweeps the beam of light containing the image across a lens 40 and it passes through individual groups of prisms 42 and framing lenses 44 to present separately framed images to the surface of a film on a film pack illustrated at 46. The relay optics of the camera 10 are somewhat complex and need not be disclosed.

The principles of such a camera are fully disclosed in Patent No. 3,161,885, issued to John W. Corcoran. Suffice it to say that the framed exposures which in the present camera are 24 in number are arranged in a rectangular group rather than on a long strip of film as is customary in framing cameras thus making possible the use of standard Polaroid film to enable immediate inspection of the photographic record.

Since illumination of the event being recorded is by the monochromatic laser light with the light created by the event filtered out before it reaches the film, the actual burning of the bridge wire together with shock waves and other phenomena accompanying the burning are readily discernible in the records made.

Referring back to the shuttering section of the camera, the slits or stops 18 produce an effect which is highly superior to other shuttering means. Most shutters are characterized by a period of light which has a rise in intensity, a period of maximum intensity and a fall or decay time. For example, the shuttering in many high speed framing cameras comprises a stop in the objective system and a similar stop in the relay system for each frame. A rotating mirror sweeps the image of the objective stop over the relay stop. Consequently as the stops begin to register, only a small amount of the light beam reaches the film. The intensity of light increases as the image of the first stop comes into full registry with the second stop and then gradually decreases. Full effective illumination of the film plane is therefore not obtained during the entire period of coincidence of the stops. As contrasted to this, the shuttering of the present camera is accomplished by light pulses that have almost no rise and fall period but a maximum period of full intensity. Considering that the focused laser beam impinging the mirror behind the stops 18 has a diameter in the order of 16 microns and that its linear velocity across the stop approaches 25 mm. per microsecond, its entry over one edge of the stop and its exit over the other edge occupy a very small part of the time that it impinges the mirror so the beam may be considered as being chopped into short periods or pulses of practically full intensity.

Another great advantage of the shuttering system of the present invention is that it takes place entirely before the beam containing an image enters the relay optics of the camera. While a small part of a lens will transmit a complete image, it is well known that poor resolution results and that the finest resolution is obtained by utilizing the entire lens area. In most shuttering systems, as in the one utilizing stops described above, the full area of the lens and particularly the relay lens is not used because of the limiting effect of the stops. Obviously in the camera of the present invention the entire beam of light containing the image to be recorded passes through the full unrestricted area of every lens in the camera.

As previously described, the same rotating mirror is utilized three times in the present camera. This has the advantage of properly timing the chopped pulses in the relay system of the camera and also of stopping the swinging motion of the beam imparted by its first impingement on the rotating mirror. The chopped beam reflected back to the rotating mirror by the mirror 22 of FIG. 2 is moving in a direction opposite to that of the mirror rotation so its motion is cancelled before it is directed toward the relay system where it is again swung by the mirror to create separate framed records.

As is apparent, the number of stops 18 in the stop plate 20 will agree with the number of frames to be exposed. The spacing of the slots is determined by spacing of the relay lenses as each pulse should coincide with the central area of a lens. Exposure time is fixed by the width of the slots.

Figure 4:
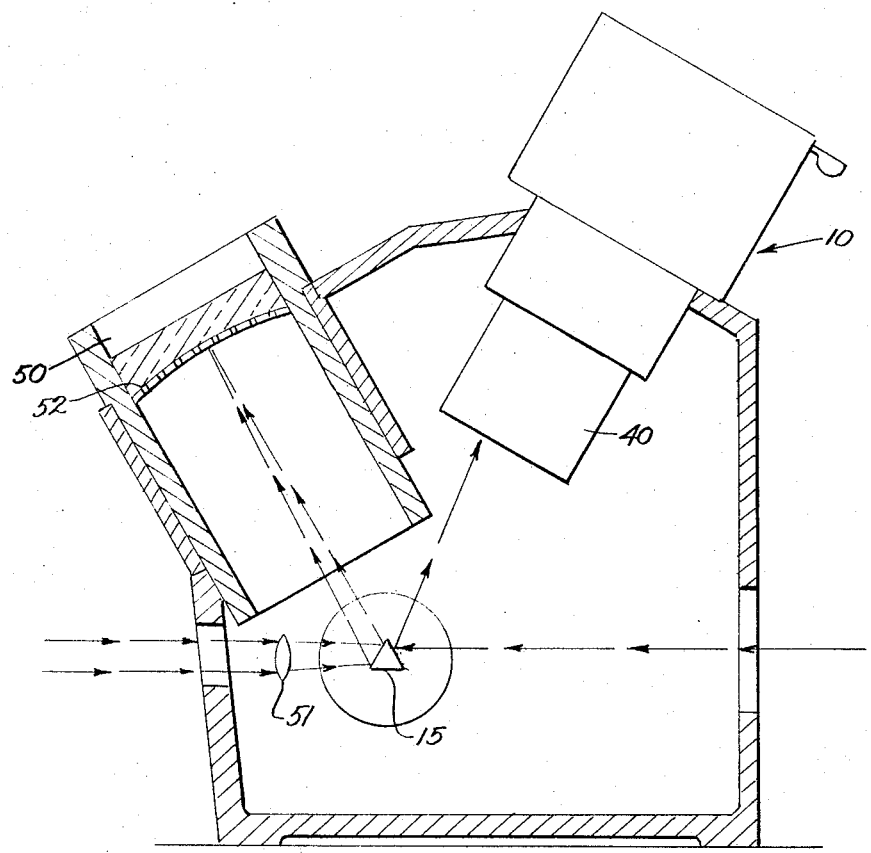
FIG. 4 is a view like FIG. 2 but illustrating a modification in the optical system of the camera.

A modified form of the invention is shown in FIG. 4 wherein a concave mirror 50 and a lens 51 are substituted for the lens 17. In this case, the stop plate shown at 52 is curved to conform to the surface of the mirror 50. In actual practice, the collimating and focusing lens 17, shown schematically in FIG. 2, is a multi-element lens and absorbs a great quantity of light. The modification of FIG. 4 is therefore preferred where intense illumination is required. The lens 51 focuses the incoming beam by way of the rotating mirror on the surface of the mirror 22 through the stops in the stop plate 52. In operation the beam returns from the mirror 50 on its own incoming path to the rotating mirror and through the lens 51 and is then directed to the relay system of the camera by mirrors as described in connection with FIG. 1.

We claim:
1. The method of producing a photographic record of a self-luminous event which comprises subjecting the event to a focused monochromatic light beam and through an objective lens system to produce an image thereof, passing the beam through a filter system to eliminate substantially all of the light produced by the event, and focusing the image on a photo sensitive medium.

2. The method of claim 1 in which the light beam is in the form of a single pulse from a pulsing laser timed to occur with the event to be recorded and including the step of dividing said pulse into shorter spaced pulses for the production of spaced framed records.

3. The method of claim 2 including the further step of passing the pulsing beam across the surface of the sensitive medium.

4. An apparatus for making a photographic record of a self-luminous event from which the intensity of illumination is undesirable, comprising a camera, means to produce a monochromatic light beam and to direct it into the camera, a station for the event in the path of the beam entering the camera, and a monochromatic filter that passes light of the same wave length as the light beam interposed between said station and the camera.

5. Means for shuttering a beam of light used for producing framed exposures in a framing camera comprising a rotating mirror positioned to intercept said beam and impart swinging motion to a reflected part thereof, and a stop having at least one aperture in the path of the moving beam, said mirror and stop being positioned to intercept said beam prior to illumination of the event to be photographed thereby.

6. The combination of claim 5 including means for directing light passing through said stop to a film supported in the camera.

7. The combination of claim 5 in which a reflecting surface is disposed behind the stop in a position to direct the beam of light passing the stop back to the rotating mirror, and means to direct the beam from the rotating mirror to film in the camera.

8. The combination of claim 7 in which the stop has a plurality of spaced apertures and the camera has a relay system including a plurality of relay lenses, and means for directing light after the second impingement on the rotating mirror to impingement on another reflecting surface thereof for reflection of pulses of light which have passed said apertures to said relay lenses.

9. The combination of claim 8 in which the rotating mirror has more than one reflecting surface, and a system of mirrors to direct light from a first reflecting surface thereof to a second reflecting surface by which it is directed to the relay system.

10. In a high speed framing camera having a support for a film to be exposed, relay lenses adjacent the film, an objective system for directing a beam containing an image of an event to be recorded toward the relay lenses, a light source, means to support the event to be recorded in the path of light between the source and objective system, and means between the source and the event for chopping light from the source into spaced pulses.

11. The combination of claim 10 in which the chopping means is a multi-aperture stop, and means to swing a focused beam from said source over said stop.

12. A high speed framing camera comprising a housing, a light chopper, a relay optical system and a multi-sided rotating mirror all in said housing, an objective system to admit light to the housing, a source of light, means to direct light from the source to a first surface of the rotating mirror for reflection to the light chopper, means to reflect chopped light back to said first surface, means to receive light from the second impingement on the first surface and direct it through the objective system to a second surface of the mirror for reflection thereby to the relay optical system.

13. The combination of claim 12 with means to support an event to be recorded in the path of light between the said first surface and the objective system.

14. The combination of claim 12 in which the source that passes light is a monochromatic laser, and a filter of the same wave length interposed between the event and the objective system.

References Cited

UNITED STATES PATENTS

| | | | |
|---|---|---|---|
| 2,960,380 | 11/1960 | Edgerton | 95—11.5 X |
| 3,029,685 | 4/1962 | Korneff et al. | 352—84 X |
| 3,137,758 | 6/1964 | Mason et al. | 88—14 |
| 3,154,371 | 10/1964 | Johnson | 346—108 |
| 3,161,885 | 12/1964 | Corcoran | 352—84 |
| 3,165,752 | 1/1965 | Jacobs | 352—84 |
| 3,181,170 | 4/1965 | Akin | 346—108 |
| 3,200,410 | 8/1965 | Frungel | 352—200 X |

JULIA E. COINER, *Primary Examiner.*